United States Patent [19]

Dubuit

[11] 4,164,279

[45] Aug. 14, 1979

[54] ASSEMBLY FOR FEEDING OBJECTS FROM A CONVEYOR TO A PRINTING STATION AND A PRINTING MACHINE HAVING SUCH A FEEDING ASSEMBLY

[76] Inventor: Jean-Louis Dubuit, 74, Boulevard Voltaire, 75011 Paris, France

[21] Appl. No.: 840,786

[22] Filed: Oct. 11, 1977

[30] Foreign Application Priority Data

Oct. 15, 1976 [FR] France ................................ 76 31017

[51] Int. Cl.[2] ............................................. B65G 37/00

[52] U.S. Cl. .................................... 198/492; 198/457; 198/461; 198/642

[58] Field of Search ............... 198/457, 459, 461, 486, 198/489, 492, 642, 689, 722, 485, 614, 409, 412; 101/38 A, 40, 126; 118/46, 238, 239; 214/1 BV, 1 BD

[56] References Cited

U.S. PATENT DOCUMENTS

| | | | |
|---|---|---|---|
| 2,284,992 | 6/1942 | Shaw | 198/642 |
| 2,813,615 | 11/1957 | Klein | 198/492 |
| 2,914,162 | 11/1959 | Anger | 198/409 |
| 3,265,183 | 8/1966 | Menge | 198/461 |
| 3,823,813 | 7/1974 | Holt | 198/461 |
| 3,997,065 | 12/1976 | Taksch | 214/1 BD |

FOREIGN PATENT DOCUMENTS

| | | | |
|---|---|---|---|
| 93496 | 2/1969 | France | 198/409 |

*Primary Examiner*—Joseph E. Valenza
*Attorney, Agent, or Firm*—Charles E. Brown

[57] ABSTRACT

An assembly for feeding objects from a conveyor on which they are conveyed lying down to a printing station of a printing machine where the objects are to be printed on. At the discharge end of the conveyor, at an ejection position, are provided a pair of spaced apart selector fingers having retaining and releasing positions for introducing and ejecting one object at a time. The object is accelerated or propelled from the ejection position by a tangential component of force exerted e.g. by a rotary brush or compressed-air jets, to a transfer carriage level and in alignment with the discharge end of the conveyor. Beyond the transfer carriage is a stabilizing back-up stop member having a suction head which steadies the ejected object on the transfer carriage. The transfer carriage is swung in a plane perpendicular to the axis of displacement of conveyor from its pick-up position to its feed-in position level with grippers which are adapted to introduce the object to be printed on into the printing station. Cams and linkages synchronize the movements of the selector fingers and a support lever swinging the transfer carriage between its pick-up and feed-in positions.

14 Claims, 6 Drawing Figures

ASSEMBLY FOR FEEDING OBJECTS FROM A CONVEYOR TO A PRINTING STATION AND A PRINTING MACHINE HAVING SUCH A FEEDING ASSEMBLY

The present invention relates generally to assemblies for feeding objects to be printed on from a supply conveyor to a printing station of a printing machine, e.g. a silk-screen printing machine.

The present invention relates more particularly to feeding assembles comprising a transfer carriage having a suction head and carried by a support lever pivotally mounted for movement between a pick-up position in which the transfer carriage receives an object from a supply conveyor and a feed-in position in which the transfer carriage is substantially level with gripper means at the printing station, which gripper means is adapted to hold the object during printing.

A printing machine equipped with such a feeding assembly is described in French Patent No. 70 13914 filed on Apr. 17, 1970 and published under No. 2,088,579.

In this printing machine the pivotal axis of the support lever for the transfer carriage is parallel to a so-called feed-in axis along which said gripper means is adapted to grab the object off the transfer carriage. A special supply conveyor, which is a part of the printing machine itself, is provided, the direction of displacement thereof being at right angles to the feed-in axis. The supply conveyor is a chain conveyor the discharge end of which intersects the path of movement of the transfer carriage from its pick-up position to its feed-in position.

The side chains of the conveyor are sufficiently spaced apart so that the transfer carriage may pass therebetween in the course of its movement and in so doing pick-up the leading object to be printed on carried by the conveyor.

This machine has given and continues to give full satisfaction.

Yet, for at least some uses this machine has the drawback of requiring the special supply conveyor and therefore cannot be supplied with objects to be printed on by separate or external supply conveyor, from for example an object dispensing station, and requiring, in addition, the utilization of a transfer means adapted to transfer the objects to be printed on from the separate supply conveyor to the special supply conveyor.

An object of the present invention is to overcome this drawback.

According to a first aspect of the invention there is provided a transfer assembly comprising a supply conveyor carrying objects in continuous motion in a first direction, a first selector finger operative to allow one object to be introduced to an ejection location at the discharge end of the conveyor and holding back following objects momentarily, and a second selector finger for retaining the object at the ejection location momentarily, means for exerting a component of force against said last mentioned object parallel to said first direction for propelling it beyond the discharge end to a waiting transfer carriage, and means for mounting said transfer carriage for reciprocating curvilinear translatory movement in a plane perpendicular to the first direction from its position for receiving the object to a delivery position in plane parallel to said position for receiving.

According to another aspect of the invention there is provided an assembly for feeding objects to a printing station of a printing machine, including a supply conveyor, a transfer carriage carried by a support lever for swinging movement about a pivotal axis between a pick-up poisition in which the transfer carriage is adapted to pick-up an object to be printed on from the supply conveyor and a feed-in position in which the transfer carriage is adjacent the printing station, comprising, in combination, the direction of displacement of the conveyor being parallel to the pivotal axis of the support lever, said transfer carriage being disposed beyond the discharge end of the conveyor at all times, and in said pick-up position said transfer carriage being substantially level with and between the discharge end of the conveyor and a back-up stop member, a pair of selector fringers associated with the conveyor at respective spaced locations along the axis of the conveyor, control means for alternately shifting said selector fingers synchronously with the swinging movement of the support lever from a retaining position in which they cross the path of movement of objects on the conveyor and a release position in which they are out of the path of movement of the objects on the conveyor.

According to a further object of the invention there is provided a printing machine, e.g. a silk-screen printing machine, provided with such a feeding assembly.

Thanks to the present invention there is a stepwise transfer of objects from the supply conveyor to the transfer carriage and from the transfer carriage to the printing station, this conveyor supplying the objects one at a time, optionally with auxiliary object propelling means, to the transfer carriage while the transfer carriage is momentarily in its stable pick-up position.

The supply conveyor may therefore be an ordinary conveyor interconnecting, directly for example, the printing machine to any kind of object dispensing station and thereby insuring feeding objects to be printed on to the printing machine directly from such a dispensing station, without a special, intermediary conveyor.

Features and advantages of the invention will become apparent from the following description, given by way of example, with reference to the accompanying drawings, in which.

Even through the object feeding assembly of the present invention may be used for any kind of printing machine, it is of particular interest for printing machines having at least one silk-screen type printing station. Since the construction and arrangement of such a printing station is well known per se and its various features are not part of the present invention, it need not be described in detail herein.

Suffice it to say, considering that objects 10 such as containers bottles or other hollow or open bodies are being printed on, the printing station will usually be equipped with gripper means adapted to grab the object 10 along its axis P, herein referred to as the feed-in axis.

As illustrated the gripper means comprise a cup-shaped member 11 and a center pin member or mandrel 12 which are both movable mounted parallel to the feed-in axis P; as the objects to be printed on are of circular section several such gripper means may be arranged in a circular array along the periphery of a barrel mounted for rotation about a horizontal axis.

Figure 1:
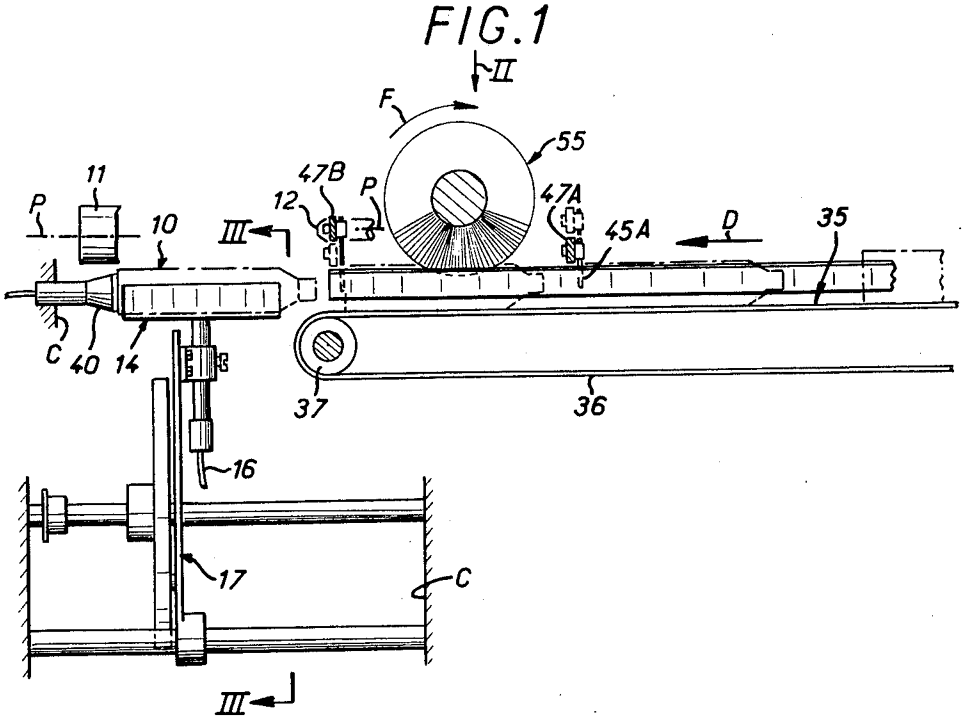
FIG. 1 is a front view, partly in elevation and partly in section, of a printing machine equipped with feeding assembly according to the invention, taken along line I—I in FIG. 2.
Figure 2:
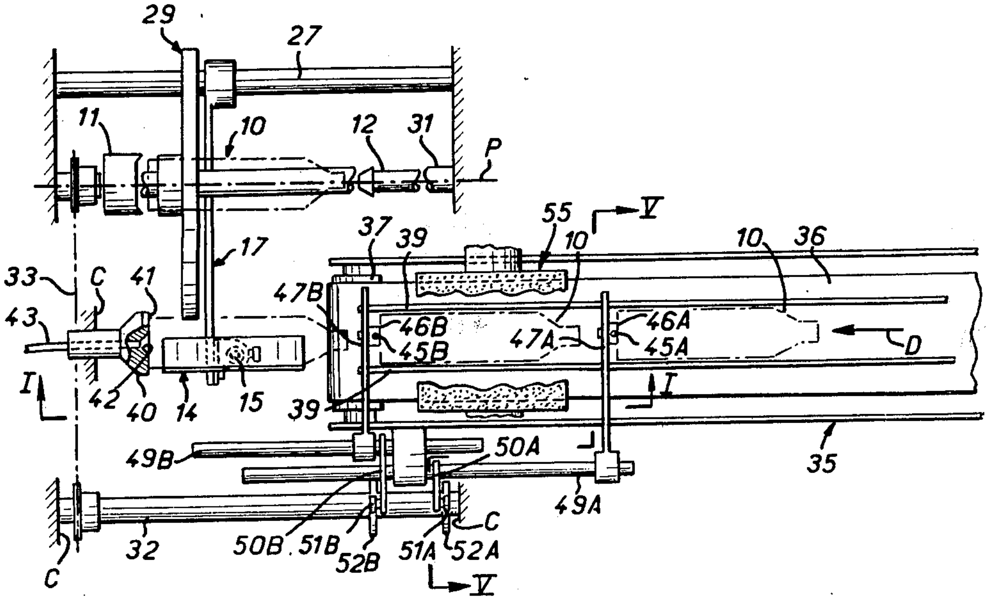
FIG. 2 is a fragmentary top plan view of the feeding assembly viewed in the direction of arrow II in FIG. 2, with parts broken away.
Figure 3:
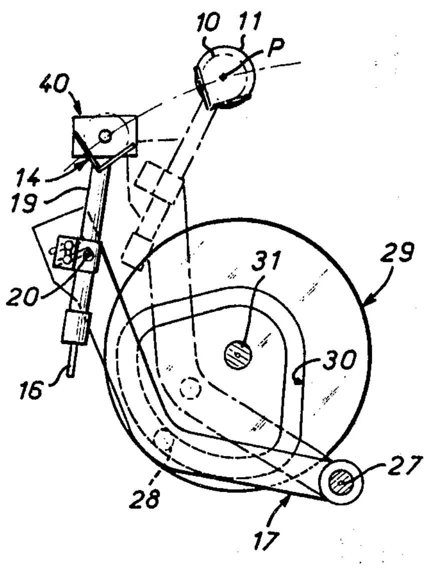
FIG. 3 is a side view, partly in elevation and partly in section, taken along the line III—III in FIG. 1.

In a manner known per se, for feeding objects to such a printing station, the printing machine is equipped with a transfer carriage 14 having a suction head 15 on its interior surface (FIG. 2) adapted to be connected to source of partial vacuum through a hose 16 (FIGS. 1 and 3). The transfer carriage 14 is carried by a support lever 17 pivotally mounted about an axis parallel to the feed-in axis P between two positions, that is, a first, pick-up position, shown in solid lines in FIGS. 1–3, in which the transfer carriage 14 is capable of receiving an object to be printed on, and a drop-off or feed-in position, shown in phantom lines in FIG. 3, in which the transfer carriage 14 transfers the object 10 substantially level and in alignment with the feed-in axis P.

In the illustrated embodiment of FIGS. 1–5, which concerns printing on objects 10 of circular cross-section, the transfer carriage 14 is generally of dihedral configuration with its common ridge parallel to the feed-in axis P, and therefore horizontal.

In any event, the transfer carriage 14 is carried by a tubular member 19 securable in position, for example by means of a set screw 20, and slidably mounted inside a sleeve 21 fixed to a plate 22 which in turn is adjustably mounted in position on the support lever 17.

Figure 4:
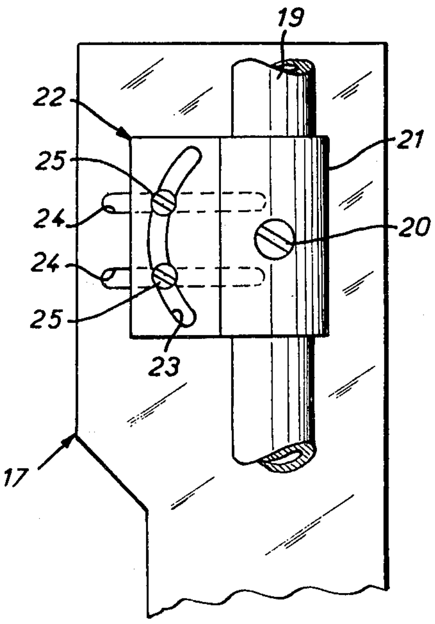
FIG. 4 is, on an enlarged scale, a fragmentary view of the feeding assembly for the printing machine.

For instance, and as illustrated, the plate 22 may have a part-circular slot 23 while the support lever 17 has two parallel transverse slots 24; screws 25 extend through the slots for locking the plate 22 into position after adjusting its position on the support lever 14, FIG. 4.

In the illustrated embodiment the support lever 17 is an elbowed lever or crank and is carried by a shaft 27 parallel to the feed-in axis P.

A follower or roller 28 is carried at the elbow of the support lever 17 which follower subjects the lever to its pivotal movement by coacting with a rotary cam 29 having for this purpose a camway 30 in which the follower or roller 28 is engaged. The rotary cam 29 is carried by a shaft 31 the axis of which is in vertical alignment with the feed-in axis, FIGS. 2 and 3; the shaft 31 is fixed for rotation with a shaft 32 by means of a chain and sprocket transmission 33 for reasons which will become apparent hereinafter. Either one of the shafts 31 and 32 is driven for rotation by the main shaft of the printing machine, according to known arrangements which are not illustrated in the drawings.

A supply conveyor 35 is usually associated with the feed assembly which has just been briefly described, the frame thereof is identified by reference character C.

The conveyor may be part of the equipment of the printing machine or a separate conveyor. In the illustrated embodiment the conveyor comprises an endless belt 36 which passes over two rolls 37 of which only one is shown in the figures and at least one is a driving roll which belt is adapted to carry objects 10 lying down. Two guides 39 are associated with the conveyor for guiding the objects thereon; the guides 39 extend horizontally above the upper run of the belt 36 and preferably, according to a known unillustrated arrangement, are adjustably mounted transversely with respect to the belt so as to adapt their position to the cross dimension of the corresponding object to be printed on.

In any event, and according to the present invention, the direction of displacement D of the conveyor 35 is parallel to the feed-in axis P, defined above, and its free end is disposed so that when the transfer carriage 14 is in its feed-in position the transfer carriage is located beyond the downstream end of the conveyor, in alignment therewith and substantially parallel thereto, FIGS. 1 and 2.

Further, according to another feature of the invention, the transfer carriage 14 then extends between the discharge end of the conveyor 35 and a so-called stabilizing back-up stop member 40 which is borne by the frame C of the printing machine and has, perpendicularly to the direction of displacement D of the conveyor 35, an abutment surface 41; in the illustrated embodiment a suction head 42 adapted to be connected by a hose 43 to any kind of source of partial vacuum, leads into the central zone of the abutment surface 41.

Of course the stabilizing back-up stop member 41 is sufficiently spaced from the discharge end of the conveyor 35 to enable free passage of the transfer carriage 14 from its pick-up position to its drop-off or feed-in position.

According to another feature of the invention two selector fingers 45A, 45B are associated with the conveyor 35 and are disposed above the conveyor and spaced therealong, proximate to the discharge end thereof. The selector fingers 45A, 45B are subjected to control means adapted to move them alternately and synchronously with the support lever 17 for the transfer carriage from a retaining position, shown in solid lines for selector finger 45A and phantom lines for the selector finger 45B in FIG. 1, in which they intersect the path of movement of the objects 10 to be printed on carried by the conveyor 35, and a retracted position, shown in phantom lines for selector finger 45A and solid lines for selector finger 45B in FIG. 1, in which they are out of the path of movement.

The selector finger 45A which is farther upstream with respect to the discharge end of the conveyor 35, is adjustably mounted in position in a mounting block 46A which in turn is adjustably mounted in position at the end of an arm 47A which extends transversely above the conveyor 35 and which is pivotally mounted about an axis parallel to the direction of displacement D of the conveyor 35. For example, the arm 47A has a slot 48A, FIG. 5, along which the mounting block 45A is displaceable, while being pivotable about an axis perpendicular to the arm, and the selector finger 45A carried by the mounting block 46A may be displaced therein; arrangements which are known per se are employed for securing the selector finger 45A in position in the mounting block 46A and for securing the mounting block 46A in position on the arm 47A.

In conjunction therewith an arm 47A which is elbowed, is adjustably mounted in position along a shaft 49A which is parallel to the direction of displacement D of the conveyor; it may be secured thereto by any conventional means.

It follows from these various arrangements that the selector finger 45A is adjustable both transversely with respect to the direction of displacement of the conveyor 35 and parallel to the direction of displacement of the conveyor, and in addition there may be adjusted the angle of inclination and height above the conveyor 35.

Figure 5:
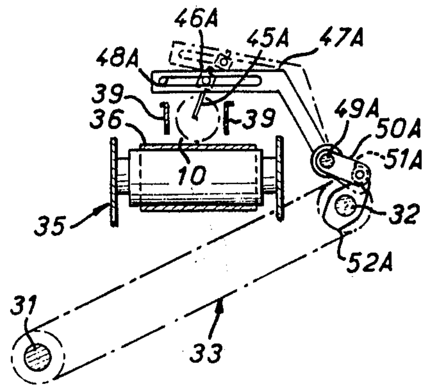
FIG. 5 is a fragmentary view in section of the transfer carriage taken on the broken line V—V in FIG. 2.

A crank 50A is keyed to the shaft 49A, FIGS. 2 and 5, carrying at its end a follower or roller 51A coacting with the cam 52A keyed for rotation with the shaft 32 described hereinbefore.

The cam 52A is thus able to cause the selector finger 45A alternately to be swung from one of its retaining or released positions to the other thereof, synchronously with the pivotal movement of the support lever 17 of the transfer carriage 14.

Of course conventional return means, such as springs, are associated with the crank 50A to hold the follower or roller 51A in contact with the corresponding cam (not illustrated).

Similar means are provided for the selector finger 45A which is farther downstream with respect to the discharge end of the conveyor 35; namely, mounting block 46B, arm 47B, shaft 49B, crank 50B, follower or roller 51B and cam 52B, FIG. 2.

Finally, there are preferably provided propelling means between the selector fingers 45A, 45B which propelling means are adapted to impart initial thrust to the object to be printed on that is in the ejection position between the selector fingers once the object has been released by the downstream selector finger 46B.

In the illustrated embodiment the propelling or ejection means comprise a soft-bristled brush 55 rotatably mounted above the conveyor 35 at a distance close enough to the upper run of the conveyor belt 36 to come into operative engagement with the object in position thereon, and according to the corresponding direction of rotation, represented by the arrow F in FIG. 1, relative to the upper run of the conveyor belt 36, a tangential force parallel to the direction of displacement D of the upper run accelerates the discharge of the object from the ejection position.

Since the objects to be printed on, which are bottles or containers, are lying down in end first position on the conveyor 35 when the transfer carriage 14 is in the pick-up position, as illustrated in FIGS. 1 and 2, and an object to be printed on is at the ejection position between the selector fingers 45A, 45B, the selector finger 45B is in its retaining position for holding back the object, while the selector finger 45A is also in its retaining position for holding back the next bottle.

By means of cam 52B the selector finger 45B is pivoted from its retaining to its retracted position, as shown in FIG. 1, and the object to be printed on, which it previously retained, is thus accelerated towards the stabilizing back-up stop member 40 by the combined thrust of the conveyor 35 and the tangential component exerted by the brush 55.

The initial thrust exerted against the object is sufficiently powerful for its bottom end to reach the abutment surface of the stabilizing back-up stop member in opposition to the suction force of the suction head 42 on the transfer carriage 14; by means of its suction head 42 the stabilizing back-up stop member 40 avoids potentional misalignment of the bottle during the propelled discharge, by forcing the end of the object against the abutment surface 41 and temporarily maintaining the object in a suitable manner so that it may then be accommodated on the transfer carriage 14 for displacement from its pick-up position to its drop-off or feed-in position under the control of the rotary cam 29.

After being grabbed by the cup-shaped member 11 and the center pin member or mandrel 12 the object is transferred to the printing station of the machine; the transfer carriage 14 15 returned to its initial pick-up position by the rotary cam 29.

In the course of movement of the transfer carriage 14 the selector finger 45B moves again from its raised, retracted position to its lowered, retaining position in response to the cam 52B, while the selector finger 45A moves, contrariwise, from its lowered, retaining position to its raised retracted position, there being enough time for a new object 10 to be printed on thus released by the selector finger 45A to come into abutment against the selector finger 45B; then it is once again lowered from its raised, retracted position to its lowered, retaining position to retain the next object 10 to be printed on.

The steps of the operating sequence just described are then repeated.

Figure 6:
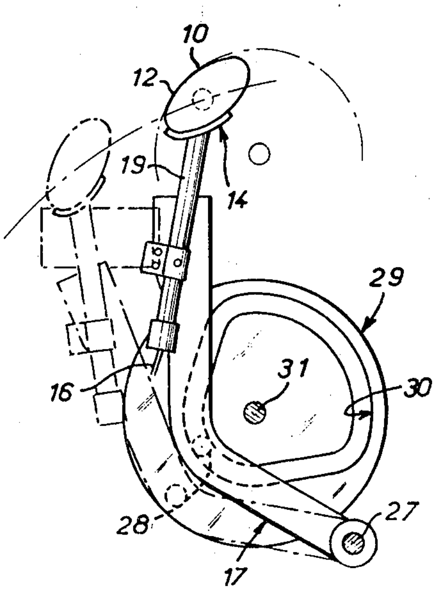
FIG. 6 is a view similar to that of FIG. 3 adapted for accommodating objects to be printed on which are oval in section.

FIG. 6 illustrates the adaptation of the feeding assembly to the case in which the objects to be printed on are of oval cross-section. In such a case the transfer carriage 14 has a configuration adapted to the oval section, and its adjustment in position on the lever 17 carrying it is effected so that the object to be printed on is grabbed at the printing station, not as above, along a feed-in axis in vertical alignment with the axis of rotation 31 of the cam 29, but along a feed-in axis offset from that of the preceding embodiment, the object being gripped in the usual manner at the periphery of the corresponding bottom end of the object.

The present invention is, of course, not limited to the foregoing embodiments described and illustrated herein but encompasses all variations and modifications within the scope of the appended claims.

In particular the brush 55 may be replaced by one or more air jets directed laterally with respect to the conveyor, or even eliminated altogether in case the adherence of the object to the conveyor belt 26 on which it lies is sufficient to permit adequate thrusting of the object to reach the abutment.

Moreover, the transfer carriage may be simplified to a mere suction head, as described in French printed certificate of addition application No. 2,102,899 related to the above mentioned printed patent application No. 2,088,579.

What I claim is:

1. A transfer assembly comprising a supply conveyor carrying objects in continuous motion in a first direction, a first selector finger operative to allow one object to be introducted to an ejection location at the discharge end of the conveyor and holding back following objects momentarily, and a second selector finger for retaining the object at the ejection location momentarily, means for exerting a component of force against said last mentioned object parallel to said first direction for propelling it beyond the discharge end to a waiting transfer carriage, stop means aligned with and spaced from said supply conveyor for stopping a propelled object in alignment with said transfer carriage, and means for mounting said transfer carriage for reciprocating curvilinear translatory movement in a plane perpendicular to the first direction from its position for receiving the object to a delivery position in plane parallel to said position for receiving.

2. A printing machine including a printing station, and a feeding assembly for feeding objects to be printed on from a supply conveyor to said printing station, said feeding assembly comprising a transfer carriage carried by a support lever for swinging movement about a pivotal axis between a pick-up position in which the transfer carriage is adapted to receive an object to be printed on from the supply conveyor and a feed-in position in which the transfer carriage is adjacent the printing station, comprising, in combination, the direction of displacement of the conveyor being parallel to the pivotal axis of the support lever, said transfer carriage being disposed beyond the discharge end of the conveyor at all times, and in said pick-up position said transfer carriage being substantially level with and between the discharge end of the conveyor and a back-up stop member, a pair of selector fingers associated with the conveyor at respective spaced locations along the axis of the conveyor, control means for alternately shifting said selector fingers synchronously with the swinging movement of the support lever from a retaining position in which they cross the path of movement of objects on the conveyor and a release position in which they are out of the path of movement of the objects on the conveyor, and object propelling means disposed between said selector fingers for accelerating the object momentarily situated between said selector fingers to said transfer carriage in its pick-up position.

3. In an assembly for feeding objects to a printing station of a printing machine, including a supply conveyor, a transfer carriage carried by a support lever for swinging movement about a pivotal axis between a pick-up position in which the transfer carriage is adapted to receive an object to be printed on from the supply conveyor and a feed-in position in which the transfer carriage is adjacent the printing station, comprising, in combination, the direction of displacement of the conveyor being parallel to the pivotal axis of the support lever, said transfer carriage being disposed beyond the discharge end of the conveyor at all times, and in said pick-up position said transfer carriage being substantially level with and between the discharge end of the conveyor and a back-up stop member, a pair of selector fingers associated with the conveyor at respective spaced locations along the axis of the conveyor, control means for alternately shifting said selector fingers synchronously with the swinging movement of the support lever from a retaining position in which they cross the path of movement of objects on the conveyor and a release position in which they are out of the path of movement of the objects on the conveyor, and object propelling means disposed between said selector fingers for accelerating the object momentarily situated between said selector fingers to said transfer carriage in its pick-up position.

4. An assembly according to claim 3, gripper means being provided at the feed-in position of said transfer carriage for taking hold of the object thereat, along a feed-in axis and introducing it at the printing station, wherein said feed-in position of said transfer carriage is level with said gripper means.

5. An assembly according to claim 3, wherein said back-up stop member is adapted to stabilize the object received at the pick-up position of said transfer carriage, said back-up stop member having suction means cooperable with the object on said transfer carriage in the pick-up position.

6. An assembly according to claim 5, wherein said suction means is disposed in a central zone of an abutment surface on said back-up stop member, substantially in a plane at right angles to the direction of displacement of said conveyor.

7. An assembly according to claim 3, wherein said propelling means comprises a rotary brush mounted for rotation about an axis in a plane at right angles to the direction of displacement of the conveyor.

8. An assembly according to claim 3, further comprising means for adjustably mounting each said selector finger parallel to said direction of displacement of the conveyor.

9. An assembly according to claim 3, further comprising means for adjustably mounting each said selector finger transversely to the direction of displacement of the conveyor.

10. An assembly according to claim 3, further comprising means for adjustably mounting each said selector finger for varying the angle of inclination of said finger relative to the general plane of said

11. An assembly according to claim 3, further comprising means for adjustably mounting each said selector finger parallel to and transverse to the direction of displacement of the conveyor and for varying the angle of inclination thereof relative to the general plane of the conveyor.

12. An assembly according to claim 3, said control means for controlling the pivotal movement of the support lever comprising a rotary cam, wherein each said selector finger is carried approximate to the distal end of an arm arranged generally transversely of the conveyor for pivotal movement about an axis parallel to the direction of displacement of the conveyor in response to a cam synchronized with said rotary cam associated with the support lever.

13. An assembly according to claim 12, further comprising means for adjustably mounting each said selector finger parallel to the direction of displacement of the conveyor, and wherein said last-mentioned means comprises means for adjusting the position of each said arm on a shaft defining axis of pivotal movement thereof, a crank fixed for rotary movement with each said shaft and coacting with the corresponding said cam.

14. In an assembly for transferring objects from a conveyor to an operating station, comprising selector means at the discharge end of the conveyor for stepwise discharge of objects from the conveyor, ejection means at said discharge end supplementing the thrust exerted by the conveyor on the endmost object for propelling the said endmost object beyond the discharge end to a transfer carriage level and in alignment therewith in its pick-up position, stop means aligned with and spaced from said supply conveyor for stopping a propelled object in alignment with said transfer carriage, and means for swinging said carriage from its pick-up position to its feed-in position parallel thereto, adjacent said operating station in a plane perpendicular to the direction of displacement of the conveyor.

* * * * *